Jan. 8, 1946.   R. H. DALTON   2,392,314
GLASS-TO-METAL SEAL
Filed March 2, 1943
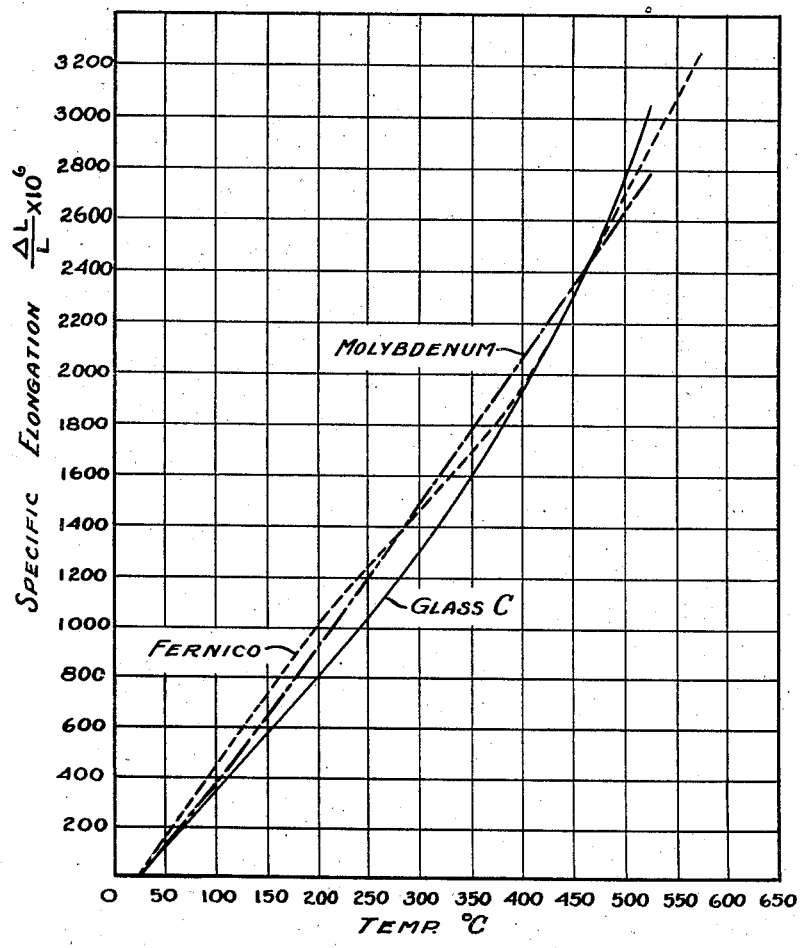
Inventor
ROBERT H. DALTON
By
F. H. Knight
Attorney Patented Jan. 8, 1946

2,392,314

UNITED STATES PATENT OFFICE 2,392,314

GLASS-TO-METAL SEAL

Robert H. Dalton, Corning, N. Y., assignor to Corning Glass Company, Corning, N. Y., a corporation of New York Application March 2, 1943, Serial No. 477,735

4 Claims. (Cl. 106—54)

This invention relates to glass-to-metal seals and particularly to hermetic glass seals with metals such as molybdenum and the alloys of iron, nickel and cobalt, an example of which is the alloy known as "Fernico" and comprising 54% Fe, 28% Ni and 18% Co.

It has heretofore been shown that such alloys are particularly suitable for sealing with certain known hard borosilicate glasses because, with respect to their expansion characteristics, these alloys more nearly resemble the glasses than do the low expansion metals, tungsten and molybdenum, which had up until then been used for sealing with borosilicate glasses.

In making a hermetic seal between these alloys and glass for electrical purposes, it not only is essential that the expansion characteristics of the metal and the glass be sufficiently well matched, but it is equally desirable that the glass have the highest possible chemical durability and electrical resistivity, coupled with a working temperature sufficiently low to avoid over-oxidation or melting of the metal when heated to glass welding temperatures, and a melting temperature sufficiently low to permit production of the glass in conventional melting units. It is also desirable that the expansion and viscosity be such that the glass is capable of sealing both to Fernico and to molybdenum.

The prior glasses used for sealing with the above mentioned alloys have not been entirely satisfactory in all these respects and, although any and all of the desirable qualifications may be obtained at the sacrifice of others, heretofore no single glass has combined them all.

An object of this invention is to provide a glass-to-metal seal which is suitable for electrical purposes at elevated temperatures.

Another object is to produce a glass suitable for such a seal and having a higher electrical resistivity at 350° C. and a better chemical durability than prior sealing glasses.

Another object is to produce a glass which will seal with an alloy of iron, nickel and cobalt and which will have a higher electrical resistivity at 350° C. and a better chemical durability than prior sealing glasses used for this purpose.

Another object is to provide a glass which will seal with Fernico and also with molybdenum.

To these and other ends the invention includes the glass and the article comprising it, to be hereinafter more fully described and claimed.

I have discovered that glass compositions containing silica, boric oxide, alumina and alkali metal oxides, the $SiO_2$ being 60–75%, $B_2O_3$ 10–20%, $Al_2O_3$ 5–10% and the alkali metal oxides comprising not over 5% $K_2O$ and not over 2% $Li_2O$, with or without but not exceeding 3% $Na_2O$, are particularly suitable for sealing with the Fe, Ni and Co alloys and with molybdenum and have a high electrical resistivity and a better chemical durability than prior glasses used for this purpose. The glasses may also contain BaO or $CaF_2$ in small amounts but these and other additional constituents should preferably not exceed about 10–15% of the total composition. Chemical durability is defined as the loss in weight in milligrams per sq. cm. which the glass undergoes during immersion for twenty-four hours in a boiling fiftieth-normal solution of sodium carbonate as compared with that of a known glass. The chemical durability is herein expressed as the ratio between the amount lost by the sample and the amount lost under the same conditions by a standard glass of high durability, and the lower the ratio the better the durability.

In Table I preferred examples of my new compositions falling within the scope of this invention are given in terms of weight per cent as calculated from their respective batches, and in Table II some of the prior glasses used for sealing with alloys of iron, nickel and cobalt are given for comparison.

Table I

|  | A | B | C | D |
|---|---|---|---|---|
| $SiO_2$ | 67.4 | 66.9 | 67.6 | 66.9 |
| $B_2O_3$ | 15.4 | 15.7 | 15.2 | 15.8 |
| $Al_2O_3$ | 7.5 | 7.4 | 7.4 | 7.4 |
| $Na_2O$ | 1.4 | .7 | 2.7 | 2.5 |
| $K_2O$ | 3.5 | 4.6 | 2.3 | 2.9 |
| $Li_2O$ | .8 | .8 | .8 | .8 |
| $CaF_2$ | 3.0 |  |  |  |
| BaO |  | 2.8 | 3.0 | 2.8 |
| KCl | 1.0 | 1.0 | 1.0 | 1.0 |
| Electrical resistivity in megohms per cm. cube at 350° C | 18.41 | 35.06 | 9.33 | 11.80 |
| Setting point temp. ° C | 460 | 467 | 459 | 461 |
| Chemical durability | 2.3 | 2.3 | 1.0 | 1.4 |

Table II

|  | E | F | G |
|---|---|---|---|
| $SiO_2$ | 66.5 | 68.5 | 65 |
| $B_2O_3$ | 20.5 | 23.0 | 24 |
| $Al_2O_3$ | 5.0 | 2.0 | 3 |
| $Na_2O$ | 8.0 | 6.5 | 0 |
| Electrical resistivity in megohms per cm. cube at 350° C | 1.32 | 5.89 | 2.57 |
| Setting point temperature °C | 495 | 476 | 474 |
| Chemical durability | 3.3 | 9 | 11 |

As a source of lithia I have preferably used lepidolite in glasses A, B, C, and D because it is cheaper than refined lithium materials and it contains, as other desirable constituents, alumina, soda, potash, and a small amount of fluorine. Other lithium-containing materials may be substituted for lepidolite if proper adjustment is made in the other batch constituents. Commercial lepidolite always contains both soda and potash in addition to lithia. My glasses, therefore, preferably contain all three of these alkali metal oxides. However, glasses which are satisfactory for my purpose and which are substantially free from soda may also be made if a soda-free source of lithia is used. This would have the disadvantage of greatly increasing the cost of the glass.

The above recited compositions, being calculated from their respective batches, are not exactly the compositions of the final glasses because there is a small indeterminate loss during melting. However, the difference is not substantial as is shown, for example, by comparing the calculated composition of glass D with that obtained by analysis which was as follows: 67.3% $SiO_2$, 15.1% $B_2O_3$, 7.4% $Al_2O_3$, 0.6% $Li_2O$, 2.6% $Na_2O$, 3.4% $K_2O$, 0.6% F, and 0.11% Cl.

It will be noted that glass D also contains by analysis a small amount of fluorine derived from the lepidolite which was used as a batch material. The fluorine contents are not stated in the calculated compositions for the new glasses A, B, C, and D; because of the uncertainty as to the quantity present and the form in which it is retained in the final glass, but there is no doubt that, like glass D, the other glasses A, B, and C also contain fluorine, the amount of which can be determined by analysis. The presence of a small amount of fluorine, whether derived from lepidolite or other fluorine-containing material, is believed to be desirable because it has a substantial influence in softening the glass and raising the chemical durability and electrical resistivity thereof.

The chemical durability and electrical resistivity of the new glasses A, B, C, and D are higher than those of the prior glasses E, F, and G. It is further noted that the setting point temperature of the new glasses A, B, C, and D are close to 460° C. By setting point temperature, as used herein, is meant the temperature below which the glass has insufficient plastic flow to relieve strains set up in the glass during cooling. For a cooling rate of about 1° C. per minute, the setting point temperature for the majority of ordinary glasses is approximately 20° C. below the annealing temperature of the glass. In order for a glass to seal successfully to a metal, the overall contraction of the glass between its setting point temperature and room temperature must be substantially the same as that of the metal between the same temperatures. In other words, the expansion curves of the glass and the metal must intersect at these temperatures. This qualification is characteristic of the new glasses and "Fernico."

I have found that the overall elongation of "Fernico" between room temperature and 460° C. is the same as that of molybdenum, that is, their expansion curves intersect at this point. This elongation amounts to $2.39 \times 10^{-3}$ parts per unit length. An important advantage of my new glasses resides in the fact that their setting point temperatures are sufficiently close to 460° C. that they can be sealed equally well either to "Fernico" or to molybdenum.

In order to illustrate the relationship between expansion and temperature for these metals and the new glasses, reference is had to the drawing which shows the so-called expansion curves obtained by plotting the specific elongation, $$\frac{\Delta L}{L} \times 10^6$$

where L is length, against temperature for molybdenum, "Fernico" and glass C of Table I. It will be seen that the three curves intersect both at room temperature and at 460° C. and that at this temperature $$\frac{\Delta L}{L} \times 10^6$$

is 2390. Since the setting point of glass C is 459° C., this glass will form successful hermetic seals with both of these metals. Practically it is not necessary that the setting point of the glass be exactly 460° C. and a small variation is permissible. However, except for very thin metal, the variation in setting point temperature of the glass from 460° C. should not be large enough to produce a difference in $$\frac{\Delta L}{L} \times 10^6$$

between the glass and the metals of more than about 100. These conditions can readily be determined by measurement. The ability of the new glasses to seal both to "Fernico" and to molybdenum is advantageous because a single glass can now be used where two would otherwise be required and the saving in melting facilities and time and materials is thus clearly apparent.

I claim:

1. A glass of high electrical resistivity and chemical durability which consists of approximately 67–67.5% $SiO_2$, 15–16% $B_2O_3$, about 7.5% $Al_2O_3$, 1–3% $Na_2O$, 3–5% $K_2O$, and about 1% $Li_2O$ and about 3% BaO, the electrical resistivity at 350° C. being over nine megohms per cm. cube and the setting point temperature of the glass being about 460° C. and its specific elongation between 25° C. and 460° C. being about $2.4 \times 10^{-3}$ parts per unit length.

2. A glass of high electrical resistivity and chemical durability which consists of approximately 67% $SiO_2$, 15% $B_2O_3$, 7.5% $Al_2O_3$, 2.5% $Na_2O$, 3.5% $K_2O$, .6% $Li_2O$ and .3% BaO, the electrical resistivity at 350° C. being over nine megohms per cm. cube, the setting point temperature of the glass being about 460° C. and its specific elongation between 25° C. and 460° C. being about $2.4 \times 10^{-3}$ parts per unit length.

3. A glass-to-metal seal in which the glass consists of approximately 67% $SiO_2$, 15% $B_2O_3$, 7.5% $Al_2O_3$, 2.5% $Na_2O$, 3.5% $K_2O$, .6% $Li_2O$ and .3% BaO, and has an electrical resistivity at 350° C. over 9 megohms per cm. cube, a setting point temperature about 460° C. and a specific elongation between 25° C. and 460° C. of about $2.4 \times 10^{-3}$ parts per unit length.

4. A glass-to-metal seal in which the glass consists of approximately 67–67.5% $SiO_2$, 15–16% $B_2O_3$, about 7.5% $Al_2O_3$, 1–3% $Na_2O$, 3–5% $K_2O$, about 1% $Li_2O$ and about 3% BaO, and has an electrical resistivity at 350° C. over 9 megohms per cm. cube, a setting point temperature about 460° C. and a specific elongation between 25° C. and 460° C. of about $2.4 \times 10^{-3}$ parts per unit length.

ROBERT H. DALTON.

CERTIFICATE OF CORRECTION.

Patent No. 2,392,314.

January 8, 1946.

ROBERT H. DALTON.

It is hereby certified that the name of the assignee in the above numbered patent was erroneously described and specified as "Corning Glass Company" whereas said name should have been described and specified as --Corning Glass Works, of Corning, New York, a corporation of New York--, as shown by the record of assignments in this office; and that the said Letters Patent should be read with this correction therein that the same may conform to the record of the case in the Patent Office.

Signed and sealed this 19th day of March, A. D. 1946.

Leslie Frazer

First Assistant Commissioner of Patents.

(Seal)